INVENTORS
HARRY M. LUI
AND MONROE ROBERT ABRAMS
BY
ATTORNEY

United States Patent Office 2,788,481
Patented Apr. 9, 1957

2,788,481

MOTOR OPERATED DRAPERY DEVICE WITH LIMIT CONTROL

Harry M. Lui and Monroe Robert Abrams, Wayne County, Mich., assignors to George Mitchell, doing business as Draw-Matic Engineering Company, Detroit, Mich.

Application November 25, 1955, Serial No. 548,808

8 Claims. (Cl. 318—267)

The present invention pertains to a novel drapery traverse device which is motor driven for pulling the traverse cord of either a single drape or a pair of drapes.

Previous devices for this general purpose are controlled by limit switches, as is the instant device, and the limit switches are actuated by various trip members on the power driven cord. Such trip members on the cord have been found objectionable because the impacts on them eventually damage or stretch the cord and also because the trip members are often distorted, whereby the operation of the limit switches becomes inaccurate.

The principal object of the invention is to overcome these difficulties and generally to provide a simpler and more compact apparatus for the purpose described. This object is accomplished generally by a pulley and gearing drive from the cord to the limit switches. The settings or adjustments of the limit switches, which are rotary switches, are made on the axial shafts thereof. These shafts are necessarily embodied in the drive train of the switches and are fitted with friction clutches for the drive. However, when a switch is adjusted through its drive shaft, it is necessary that the gear system be not displaced thereby, for such displacement would nullify the adjustment. With this consideration in view, irreversible worm gearing is provided for the final drive on the limit switch shafts.

Further objects and advantages of the invention will appear as the description proceeds.

Figure 1:
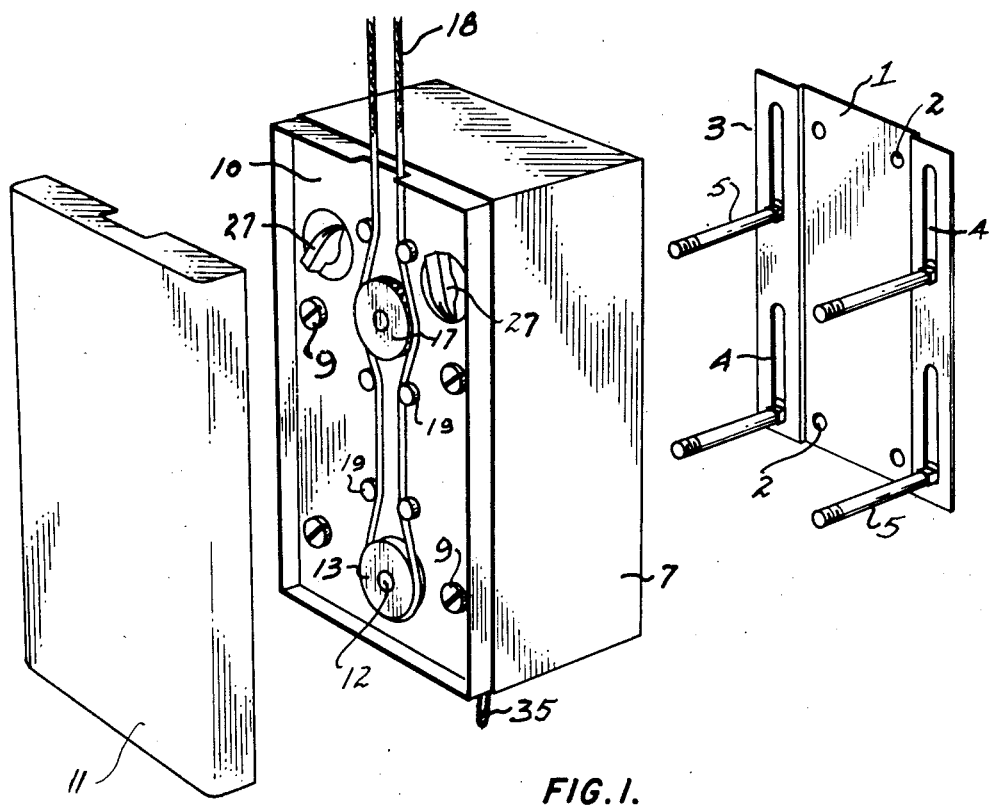
Figure 2:
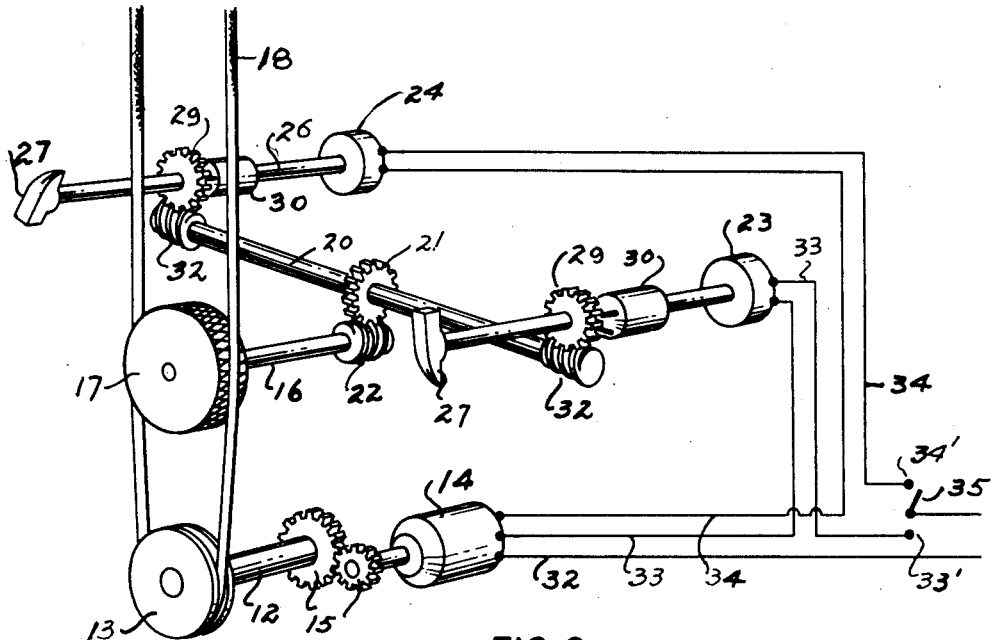
Figure 3:
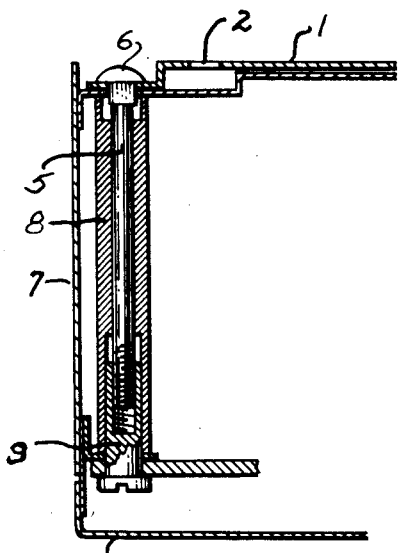
Figure 4:
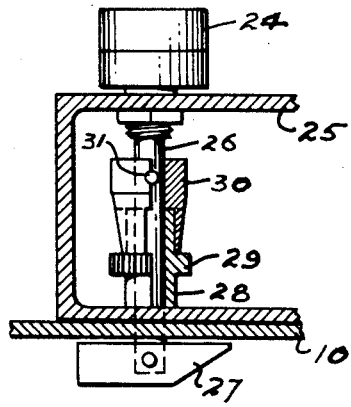

The invention is fully disclosed by way of example in the following description and in the accompanying drawings in which Figure 1 is an exploded perspective view of the device;

Figure 2 is a perspective view of the mechanism within the housing, showing also a wiring diagram, and Figure 3 is a fragmentary sectional view, to an enlarged scale, illustrating the means for connecting the housing to the wall mounting plate, and Figure 4 is a fragmentary view partially in section and to an enlarged scale, showing the limit switch and control means therefor.

Reference to these views will now be made by use of like characters which are employed to designate corresponding parts throughout.

A wall mounting plate 1 is secured to a wall by inserting mechanical fastening means through apertures 2. The plate is formed with offset flanges 3 having vertical slots 4 through which carriage bolts 5 having heads 6 are inserted. A box-like housing 7 is mounted on the screws 5, with sleeves 8 which are attached to the box receiving the screws (see Figure 3). The final attachment is made by means of internally threaded screws 9 passed through the front panel 10 of the housing and screwed on the threads of the bolts 5. A cover plate 11 is fitted on the front of the housing to conceal certain parts exposed at the front panel 10, as will be described.

In the bottom center of the front panel 10 is rotatably mounted a drive shaft 12 carrying a drive pulley 13 exposed at the front panel 10. The shaft 12 is driven by a reversible motor 14 through reduction gearing 15, all properly supported within the housing 7. Above the shaft 12 is a driven shaft 16 carrying a travel distance control pulley 17 also exposed at the front panel 10. An operating cord 18 connected to the usual draw cords of the traverse mechanism (not shown) is passed around the bottom of the pulley 13 and along opposite arcs of the pulley 17. Smaller guide pulleys 19 on the panel 10 engage both laps of the cord 18 to hold them in firm contact with the pulleys 13 and 17 as described. The tension of the cord 18 is adjusted as required by loosening the screws 9 and sliding the screws 5 in their respective slots 4, to raise or lower the housing and wall plate. Thereafter, the screws 9 are again tightened.

A cross shaft 20 journaled in the housing carries a worm gear 21 driven by a worm 22 on the shaft 16. The shaft 20 serves to actuate a pair of rotary limit switches 23 and 24 mounted on a supporting frame 25 in the housing (see Fig. 4).

This frame is constructed to support the various parts that have been described as mounted in the housing. The rotary limit switches are of standard construction comprising each a fixed contact plate swept by a rotary contact finger (not shown) actuated by a shaft 26 extending through the panel 10 to the forward side thereof where it is fitted with a setting knob 27. Each shaft 26 carries a sleeve 28 formed with a worm gear 29. The gear 29 is frictionally attached to the shaft by means of a slotted sleeve 30 engaging the sleeve or hub 28 and rigidly secured to the shaft by a set screw 31 or the like. The ends of the cross shaft 20 are fitted with worms 32 meshing with the respective worm gears 29. It is now apparent that, when a limit switch 23 and 24 is to be set by turning the corresponding knob 27, the corresponding gear 29 will be locked against the worm 32, since this gearing can be driven only from the worm. The secured sleeve 30 will slip around the hub 28, permitting the rotation of the shaft 26 and the described setting of the limit switch without altering the position of the gearing.

The motor 14 is rendered reversible by the provision of three lines 32, 33 and 34 leading thereto. The limit switch 23 is connected in series with the line 33, and the switch 24 with the line 34, the line 32 being common. Between the terminals 33' and 34' and the lines 33 and 34 is mounted a single pole double throw manual switch 35 which determines the direction of the motor 14 and the energization of the corresponding limit switch 23 and 24. The switch 35 is mounted at the bottom of the housing 7 as shown in Figure 1.

With reference to setting of the limit switches in relation to the travel of the cord 18 for a complete movement of the drapery in either direction, it may be assumed that the contactor shaft 26 has a maximum rotation of 180° from start to cut-off and that the described travel of the cord 18 requires a shaft rotation of only 120° to cut-off, after the considerable reduction in the gear train. In such case it is only necessary to set the limit switch contactor finger 60° ahead by a corresponding rotation of the shaft 26 at the knob 27. On installation, one switch is set by being turned off when the drapery comes to closed position, and the other limit switch is set in like manner when the drapery comes to the desired open position, the respective switches being energized until manually opened. Thereafter, each switch will open automatically on completion of the corresponding movement of the drapery.

It has been indicated that the limit switches 23 and 24 are energized alternately according to the direction of the motor 14, as determined by the position of the switch 35, for moving the drapery in one direction or the other. The energized switch will open the motor circuit at the completion of the drapery movement, and the unenergized switch will have its contactor finger moved through the gearing and its shaft 26 to the starting position for reverse movement. The latter movement, on being initiated, will be arrested at the proper time on opening of the motor circuit through the corresponding limit switch in the manner already described.

Although a specific embodiment of the invention has been illustrated and described, it will be understood that various alterations in the details of construction will be made without departing from the scope of the invention as indicated by the appended claims.

What we claim is:

1. A drapery traverse device comprising a drive pulley, a reversible motor for said pulley, a control pulley adjacent to said drive pulley, whereby a cord entraining said drive pulley may frictionally engage and drive said control pulley, a limit switch in the circuit of said motor, a shaft for actuating and shutting said switch, a gear frictionally mounted on said shaft, a one-way driving member driven by said control pulley and operative on said gear and resisting a driving force initiated at said gear, said shaft being extended for manual engagement, whereby it may be rotated manually to adjust said switch without displacing said gears.

2. A drapery traverse device comprising a drive pulley, a reversible motor for said pulley, a control pulley adjacent to said drive pulley, whereby a cord entraining said drive pulley may frictionally engage and drive said control pulley, a limit switch in the circuit of said motor, a shaft for actuating and shutting said switch, a gear frictionally mounted on said shaft, a one-way driving member driven by said control pulley and meshing with said gear and resisting a driving force initiated at said gear, said shaft being extended for manual engagement, whereby it may be rotated manually to adjust said switch without displacing said gears.

3. A drapery traverse device comprising a drive pulley, a reversible motor for said pulley, a control pulley adjacent to said drive pulley, whereby a cord entraining said drive pulley may frictionally engage and drive said control pulley, said motor having two circuits for determining the direction of rotation thereof, a limit switch in each circuit, each switch having a shaft for actuating and setting the switch, a gear frictionally mounted on each shaft, a one-way driving member driven by said control pulley and operative on said gears and resisting a driving force initiated at said gears, said shafts being extended for manual engagement, whereby they may be rotated manually for adjusting said switches without displacing said gears, and a manual switch for selecting either motor circuit.

4. A drapery traverse device comprising a drive pulley, a reversible motor for said pulley, a control pulley adjacent to said drive pulley, whereby a cord entraining said drive pulley may frictionally engage and drive said control pulley, said motor having two circuits for determining the direction of rotation thereof, a limit switch in each circuit, each switch having a shaft for actuating and setting the switch, a gear frictionally mounted on each shaft, one-way driving train driven by said control pulley and meshing with said gears and resisting a driving force initiated at said gears, said shafts being extended for manual engagement, whereby they may be rotated manually for adjusting said switches without displacing said gears, and a manual switch for selecting either motor circuit.

5. The device as set forth in claim 2 and wherein said one-way driving member is a worm and said gear is formed to mesh with said worm.

6. The device set forth in claim 4, wherein said train includes worms meshing with said gears, said gears being worm gears.

7. A drapery traverse device comprising a drive pulley, a reversible motor for said pulley, a control pulley adjacent to said drive pulley, whereby a cord entraining said drive pulley may frictionally engage and drive said control pulley, said motor having two circuits for determining the direction of rotation thereof, a limit switch in each circuit, each switch having a shaft for actuating and setting the switch, a gear frictionally mounted on each shaft, a countershaft driven by said control pulley, one-way drive members on said countershaft and operating on said gears, and resisting a force initiating at said gears, said actuating shafts being extended for manual engagement, whereby they may be rotated manually for adjusting said switches without displacing said gears, and a manual switch for selecting either motor circuit.

8. A drapery traverse device comprising a drive pulley, a reversible motor for said pulley, a control pulley adjacent to said drive pulley, whereby a cord entraining said drive pulley may frictionally engage and drive said control pulley, said motor having two circuits for determining the direction of rotation thereof, a limit switch in each circuit, each switch having a shaft for actuating and setting the switch, a gear frictionally mounted on each shaft, a countershaft driven by said control pulley, worms on said countershaft and meshing with said gears, said actuating shafts being extended for manual engagement, whereby they may be rotated manually for adjusting said switches without displacing said gears, and a manual switch for selecting either motor circuit.

No references cited.